(12) United States Patent
Kim et al.

(10) Patent No.: US 9,003,073 B2
(45) Date of Patent: Apr. 7, 2015

(54) COMMUNICATION CONNECTOR ENABLING COMMUNICATION STATUS THEREOF TO BE DETERMINED INDEPENDENTLY AND COMMUNICATION APPARATUS COMPRISING THE SAME

(71) Applicant: WIZnet Co., Ltd., Seongnam-si, Gyeonggi-do (KR)

(72) Inventors: Yeon Seop Kim, Yongin-si (KR); Bong Jun Hur, Yongin-si (KR); Jin Bum Kim, Seoul (KR)

(73) Assignee: WIZnet Co., Ltd., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/255,978

(22) Filed: Apr. 18, 2014

(65) Prior Publication Data

US 2014/0351611 A1 Nov. 27, 2014

(30) Foreign Application Priority Data

May 22, 2013 (KR) ........................ 10-2013-0057707

(51) Int. Cl.
*G06F 3/00* (2006.01)
*G06F 1/00* (2006.01)
*G06F 1/26* (2006.01)
*H04L 12/24* (2006.01)

(52) U.S. Cl.
CPC ................ *G06F 1/266* (2013.01); *H04L 41/26* (2013.01)

(58) Field of Classification Search
None
See application file for complete search history.

(56) References Cited

U.S. PATENT DOCUMENTS

| | | | |
|---|---|---|---|
| 7,061,365 B2 | 6/2006 | Izumi | |
| 8,055,810 B2* | 11/2011 | Shan et al. | 710/18 |
| 8,275,915 B2* | 9/2012 | Chen | 710/16 |
| 2002/0061002 A1* | 5/2002 | Nitta | 370/338 |
| 2003/0179709 A1* | 9/2003 | Huff | 370/248 |
| 2005/0114710 A1* | 5/2005 | Cornell et al. | 713/201 |
| 2007/0206630 A1* | 9/2007 | Bird | 370/465 |
| 2008/0317039 A1* | 12/2008 | Satterlee et al. | 370/395.5 |
| 2010/0091688 A1* | 4/2010 | Staszewski et al. | 370/277 |
| 2010/0189185 A1* | 7/2010 | Sugino | 375/257 |
| 2011/0170577 A1* | 7/2011 | Anvari | 375/219 |

FOREIGN PATENT DOCUMENTS

| | | |
|---|---|---|
| JP | 2001177667 A | 6/2001 |
| JP | 2005101918 A | 4/2005 |
| KR | 1020010003793 A | 1/2001 |
| KR | 1020040071796 A | 8/2004 |
| WO | WO2004070514 A2 | 8/2004 |

* cited by examiner

*Primary Examiner* — Hyun Nam
(74) *Attorney, Agent, or Firm* — Revolution IP, PLLC

(57) ABSTRACT

Disclosed is a communication connector enabling the communication status thereof to be determined independently which makes it possible to determine the communication status of the communication connector by the communication connector itself independently without the involvement of a processor for controlling the communication connector through wired data communication and a communication apparatus comprising the communication connector.

9 Claims, 5 Drawing Sheets

COMMUNICATION CONNECTOR ENABLING COMMUNICATION STATUS THEREOF TO BE DETERMINED INDEPENDENTLY AND COMMUNICATION APPARATUS COMPRISING THE SAME

CROSS-REFERENCE(S) TO RELATED APPLICATION

This application claims priority of Korean Patent Application No. 10-2013-0057707, filed on May 22, 2013, in the Korean Intellectual Property Office, which is hereby incorporated by reference in its entirety.

BACKGROUND (a) Technical Field

The present invention relates to a communication connector enabling the communication status thereof to be determined independently and a communication apparatus comprising the communication connector, and more particularly to a communication connector enabling the communication status thereof to be determined independently which makes it possible to determine the communication status of the communication connector by the communication connector itself independently without the involvement of a processor for controlling the communication connector through wired data communication and a communication apparatus comprising the communication connector.

(b) Background Art

As data sharing has become more common between multiple devices, the establishment of a communication interface is now essential in devices. However, such establishment of a communication interface requires an addition of various technical elements, and for example, requires inevitably the establishment of a communication stack on the seven (7) layers of the OSI (Open System Interconnection) model.

There are several methods to establish such a communication stack. As one of the typical methods, there is a technique of replacing the processor of an apparatus that requires the establishment of a communication interface with a processor capable of supporting software-wise the implementation of a communication stack.

Such a technique of replacement requires a processor with higher performance to replace and furthermore, needs more extensive verification due to the addition of communication functionality and other functions required by a device during development. Accordingly, it may cause a problem of rising cost and a decline in product reliability.

Alternatively, there is a technique in which an existing processor included in an apparatus that needs the establishment of a communication interface is used as it is and the apparatus further includes a communication processor (for example, a processor capable of executing programs of the communication stack, a chipset consisting of logic for communication conversion, etc.) capable of connecting to the existing processor through serial communication and of processing the communication stack.

Such a technique of adding a communication processor can utilize the same software and the like configured on the existing processor as it is, and can simply use a dedicated communication processor and the like so as to maintain the reliability in relation to the functionality of an existing apparatus, thereby simplifying the development.

However, such a technique of adding a communication processor has several drawbacks. For example, since the existing processor is connected to the dedicated communication processor through a serial interface and the dedicated communication processor is controlled by the existing processor, the technique of adding a communication processor may cause a difficulty in determining whether it is a problem of the communication processor itself or it is a problem resulting from inaccurate control of the communication processor by the existing processor when communication is not possible through the communication processor.

The problem will get worse in the case that the dedicated communication processor automatically converts a data packet from a TCP (Transmission Control Protocol) packet or IP (Internet Protocol) packet to a MAC (Media Access Control) packet and then outputs it through an external communication interface.

Moreover, there exist problems in that such a technique of adding a communication processor needs to further include a dedicated communication processor in an apparatus, thereby causing the size of the apparatus to increase and it is necessary to significantly modify the design of the board in the apparatus.

Therefore, there is a need for a communication connector enabling the communication status thereof to be determined automatically so as to resolve the problems arising from the technique of adding a communication processor, and a communication apparatus comprising the communication connector.

SUMMARY OF THE INVENTION

The present invention is designed to solve the above problems, and it is an object of the present invention to provide a communication connector enabling the communication status thereof to be determined independently that makes it possible to determine the status of network connection by allowing a network to be configured independently during the initialization such as application of electric power or reception of a reset signal, and a communication apparatus comprising the communication connector.

It is another object of the invention to provide a communication connector enabling the communication status thereof to be determined independently that provides a dedicated communication processor while reducing the size thereof and that can minimize the modification of design of the board thereof and a communication apparatus comprising the communication connector.

It is yet another object of the invention to provide a communication connector enabling the communication status thereof to be determined independently that makes it possible to determine the communication status from outside by allowing a response message to a received ICMP (Internet Control Message Protocol) message to be generated independently by default configured network address without the involvement of a processor controlling the communication connector, prior to control through wired data communication such as internal serial communication thereof, and a communication apparatus comprising the communication connector.

The objects to achieve by the present invention are not limited to those mentioned above, and other objects that have not been described will be clearly understood by a person having an ordinary skill in the art to which the invention pertains from the following description.

In order to achieve the above objects, a communication connector enabling the communication status thereof to be determined independently, comprises: a communication port for connecting to a cable jack for LAN communication; a selection unit for receiving a selection signal, a first serial data signal, and a second serial data signal and for outputting one of the first serial data signal and the second serial data signal as a third serial data signal according to the selection signal; and a data conversion unit for receiving the third serial data signal, for recording network information from the third serial data signal, and for transmitting and receiving data for LAN communication to the communication port according to the recorded network information.

The communication connector further comprises: an auxiliary control unit for outputting the second serial data signal and the selection signal; and a plurality of contacts for connecting signal lines containing the first serial data signal and a power signal or a reset signal, wherein the auxiliary control unit starts operating upon application of electric power through the power signal or by reception of the reset signal, configures the selection signal to select the second serial data signal, outputs the second serial data signal containing the network information, and thereafter configures the selection signal to select the first serial data signal.

The network information comprises an IP address, a sub-mask, and a gateway address and the data conversion unit generates a response message to an ICMP (Internet Control Message Protocol) message received through the communication port and outputs the response message through the communication port, using the IP address, the sub-mask, and the gateway address recorded from the auxiliary control unit, before recording the IP address, the sub-mask, and the gateway address from the first serial data signal.

The communication connector further comprises a power control unit for supplying electric power to the auxiliary control unit and the data conversion unit, wherein the power control unit starts supplying electric power to the auxiliary control unit and the data conversion unit upon application of electric power through the power signal or removal of the reset signal, so as to allow the auxiliary control unit to configure the selection signal.

The communication connector further comprises a shield for housing the communication port, wherein the auxiliary control unit, the selection unit, and the data conversion unit are contained in the shield as a single chipset through SIP (System In Package).

The data conversion unit comprises: a register map comprising a plurality of registers accessible through the third serial data signal; and a data conversion sub-unit for performing packet conversion of received data from the transport layer to the data link layer, based on a register value of the register map, wherein the register map comprises registers for the IP address, the sub-mask, and the gateway address which are used in the transport layer or in a lower layer of the transport layer and are included in the network information, and wherein one or more of the IP address, the sub-mask, and the gateway address are configured automatically during initialization of the communication connector.

The communication connector is an RJ-45 connector, and the serial data signal is a signal of SPI communication, a signal of I2C communication, a signal of UART communication, or a signal of USB communication.

In addition, a communication apparatus to achieve the above objects comprises a communication connector enabling the communication status thereof to be determined independently, wherein the communication connector comprises: a communication port for connecting to a cable jack for LAN communication; a selection unit for receiving a selection signal, a first serial data signal, and a second serial data signal and for outputting one of the first serial data signal and the second serial data signal as a third serial data signal according to the selection signal; and a data conversion unit for receiving the third serial data signal, for recording network information from the third serial data signal, and for transmitting and receiving data for LAN communication to the communication port according to the recorded network information.

The communication apparatus further comprises a main control unit for controlling a data conversion unit of the communication connector through a signal of serial data communication, wherein the data conversion unit of the communication connector outputs a ready signal to the main control unit after configuring assigned network information during initialization, wherein the main control unit can control the data conversion unit through the serial data communication after reception of the ready signal, and wherein the network information comprises one or more of an IP address, a sub-mask, and a gateway address.

The communication connector enabling the communication status thereof to be determined independently and the communication apparatus comprising the communication connector in accordance with the present invention as described above have an effect of making it possible to determine the status of network connection by allowing a network to be configured independently during the initialization such as application of electric power or reception of a reset signal.

In addition, the communication connector enabling the communication status thereof to be determined independently and the communication apparatus comprising the communication connector in accordance with the present invention as described above have an effect of providing a dedicated communication processor while reducing the size thereof and of minimizing the modification of design of a board.

Moreover, the communication connector enabling the communication status thereof to be determined independently and the communication apparatus comprising the communication connector in accordance with the present invention as described above have an effect of making it possible to determine the communication status from outside by allowing a response message to a received ICMP (Internet Control Message Protocol) message to be generated independently by a default configured network address without the involvement of a processor controlling the communication connector, prior to control through wired data communication such as internal serial communication thereof.

The effects that can be obtained by the present invention are not limited to those mentioned above, and other effects that have not been described will be clearly understood by a person having an ordinary skill in the art to which the invention pertains from the following description.

BRIEF DESCRIPTION OF THE DRAWINGS

The above and other aspects, features and advantages of exemplary embodiments of the present invention will be fully understood from the following description taken in conjunction with the accompanying drawings, in which.

[Reference numerals]

| | |
|---|---|
| 100: communication connector | |
| 110: board interface | 120: power control unit |
| 130: external interface | 140: auxiliary control unit |
| 150: selection unit | 160: data conversion unit |
| 161: board interface unit | 162: register map |
| 163: TX buffer | 164: RX buffer |
| 165: data conversion sub-unit | |
| 170: communication port | 180: internal communication contacts |
| 200: communication apparatus | |
| 210: memory | 220: input interface |
| 230: output interface | 240: main control unit |
| 250: system bus/control bus | |

SUMMARY OF THE DISCLOSURE

The above objects, features, and advantages will be more apparent from the following detailed description with reference to the accompanying drawings, and the spirit and principle of the present invention will be readily practiced by a person having an ordinary skill in the art to which the invention pertains. If a detailed description of known techniques relevant to the present invention is considered to obscure the summary of the present invention in describing the present invention, such a detailed description will be omitted.

Throughout the description, when a part is described to "comprise" a component, such a description does not mean to exclude other components but to further comprise other components as well unless specifically indicated otherwise. In addition, such terms as "part," "section," "module," "unit," etc. described herein represent a unit for processing at least one function or operation, which may be implemented with hardware or software or a combination of hardware and software.

Hereinafter, preferred embodiments of the present invention will be described in detail with reference to the accompanying drawings.

Figure 1:
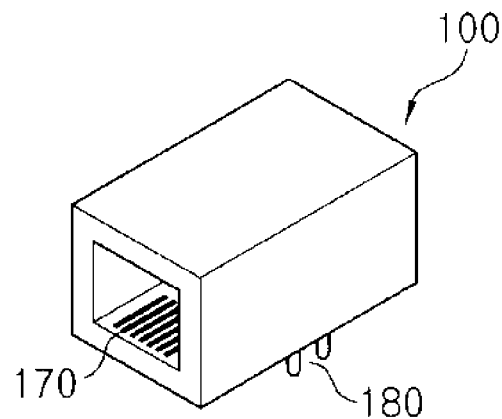
FIG. 1 shows an exemplary perspective view of a communication connector in accordance with the present invention.
Figure 2:
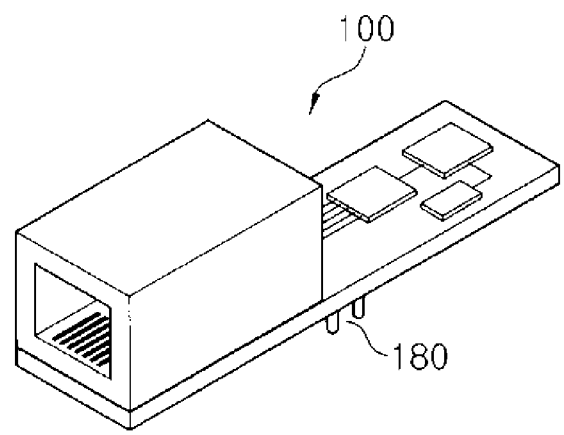
FIG. 2 shows another exemplary perspective view of the communication connector in accordance with the present invention.
Figure 3:
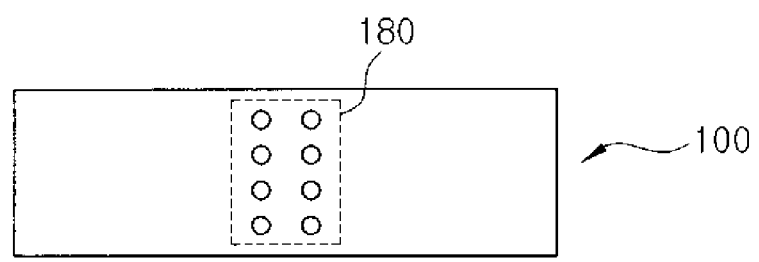
FIG. 3 shows an exemplary bottom view of the communication connector in accordance with the present invention.

FIGS. 1 to 3 show an exemplary external appearance of a communication connector 100 in accordance with present invention. FIGS. 1 and 2 show perspective views of the exemplary communication connector 100, respectively, and FIG. 3 shows a bottom view of FIG. 1 or 2.

The communication connector 100 may be an RJ-11, RJ-12, or RJ-45 connector (see FIG. 1) or may comprise an RJ-11, RJ-12, or RJ-45 connector, and may comprise a sub-board (see FIG. 2) that is attached or molded to the connector. Advantageously, the communication connector 100 may be an RJ-45 connector or may comprise an RJ-45 connector that can be connected to a UTP (Unshielded Twisted Pair wire) cable jack used in LAN communication.

The communication connector 100 comprises a communication port 170 for connecting to a wired communication line such as a LAN communication cable, and further comprises internal communication contacts 180 for connecting to the board of a communication apparatus 200 (see FIG. 7) to which the communication connector 100 will be mounted.

The communication port 170 is a port to allow the signal lines from a communication cable to be received therein, thereby providing wired communication such as LAN communication of short distance. For example, the communication port 170 receives the jack of a UTP cable, so as to feed the signal lines of the jack into the communication connector 100.

The internal communication contacts 180 are an interface for connecting to the board of the communication apparatus 200 to which the communication connector 100 is mounted. The internal communication contacts 180 consist of a plurality of pins or a plurality of pads (see FIG. 3), so that they may be mounted to the board of the communication apparatus 200 by means of SMT (Surface Mount Technology), soldering, and so on.

The internal communication contacts 180 make it possible to connect signal lines for wired data communication with a main control unit 240 (see FIG. 7) such as a processor mounted to the board of the communication apparatus 200, a control signal line for connection controlling the communication connector 100, a ground signal line, power signal line, and so on.

The wired data communication may be parallel data communication (for example, 8-bit data communication through eight lines) for simultaneous transmission of a plurality of data bits or serial data communication capable of sequential data transmission over a single line, depending on the communication scheme of the main control unit 240.

The communication connector 100 may comprise a control board (not shown) inside an RJ-45 shield (see FIG. 1) or outside the RJ-45 shield (see FIG. 2).

Here, the serial communication which is a type of wired data communication may be, for example, I2C (Inter-Integrated Circuit), SPI (Serial to Peripheral Interface), UART (Universal Asynchronous Receiver Transmitter), or USB (Universal Serial Bus) communication, and so on.

Such serial communication may sequentialize parallel data so as to transmit and receive using a single signal line or a plurality of signal lines.

Hereinafter, the description is made under the assumption that the wired data communication is serial communication. However, the spirit and principle of the present invention may be obviously applied to parallel communication as well by a person skilled in the art.

The control board included in the communication connector 100 converts the communication data received via the communication port 170 and transmits them to the main control unit 240 of the communication apparatus 200 through serial communication of the internal communication contacts 180. In addition, the control board may convert the data received from the main control unit 240 and the like through serial communication of the internal communication contacts 180 into communication data, so as to transmit them through the communication port 170.

With such a communication connector 100, it is possible to reduce the size of the communication apparatus 200 to which the communication connector 100 is mounted and to simplify the design of the communication apparatus.

Furthermore, the communication connector 100 may further comprise an LED (Light Emitting Diode), so that the LED may be lighted under the control of the control board to which the LED is connected. For example, the LED may make it possible to determine whether the communication status is normal or faulty.

Such a communication connector 100 may execute the TCP/IP conversion and/or the Ethernet conversion of the serial data or parallel data received from the main control unit 240 to output them as an analog signal of the physical layer through the communication port 170 and transmit it to the main control unit 240 through the inverse conversion.

The communication connector 100 will be discussed in more detail with reference to FIGS. 4 to 7.

Figure 4:
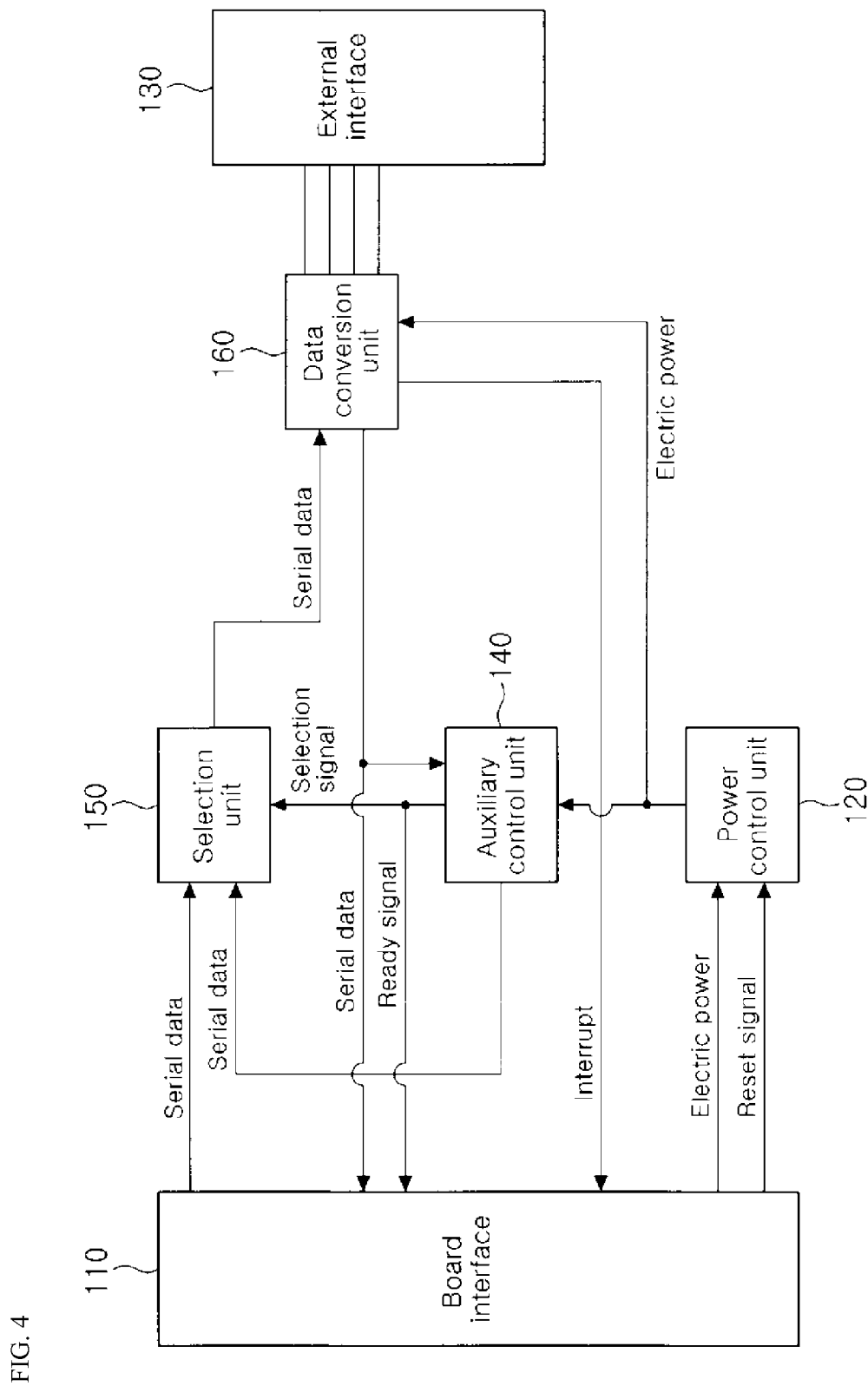
FIG. 4 shows an exemplary block diagram included in the communication connector in accordance with the present invention for configuring the communication status thereof.

FIG. 4 shows an exemplary block diagram included in the communication connector 100 in accordance with the present invention for configuring the communication status thereof. Such a block diagram of FIG. 4 may be preferably configured on the control board of the communication connector 100.

According to FIG. 4, the communication connector 100 comprises a board interface 110, a power control unit 120, an external interface 130, an auxiliary control unit 140, a selection unit 150, and a data conversion unit 160. Some of these blocks may be omitted as necessary.

Such an exemplary block diagram may be configured on the control board included inside the enclosure (shield) of the RJ-45 connector or attached to the enclosure of the RJ-45 connector.

For each of the blocks in FIG. 4, the board interface 110 is an interface connected to the internal communication contacts 180 for connecting signal lines between the communication connector 100 and the communication apparatus 200 to which the communication connector 100 is mounted.

The board interface 110 makes it possible to connect a plurality of signal lines to each other. For example, the board interface 10 may connect signal lines for serial communication which is a type of wired data communication, control signal lines such as a ready signal indicative of whether the main control unit 240 of the communication apparatus 200 is allowed to connect to the communication connector 100, a ground signal line, a power signal line, a reset signal line, and so on to one another.

Such a board interface 110 may comprise, for example, a cable containing a plurality of signal lines for connecting to the communication apparatus 200 or a conductor for connecting a plurality of signal lines to each other.

The signal lines for serial communication of the board interface 110 may be different from each other depending on the type of serial communication.

In the case of the UART communication type for instance, the board interface 110 may comprise a TX (transmission) signal line for serial data and an RX (reception) signal line for serial data, and may further comprise signal lines for flow control.

In the case of the I2C communication type, the board interface 110 may comprise an SDA signal line for transmission and reception of serial data and a clock signal line (SCL) for synchronization of the serial data of the SDA signal line.

Alternatively, in the case of the SPI communication type, the board interface 110 may comprise an MOSI (Master Out Slave In) signal line, an MISO (Master In Slave Out) signal line, a clock signal line (SCK), and a chip select (CS) signal line.

In the case of the USB communication type, the board interface 110 may comprise a D+ signal line, a D− signal line, and so on.

The signal lines for such serial communication allow parallel data of 8-bits to 32-bits to be transmitted or received as serial data synchronized with clock and the like over a single signal line or a plurality of signal lines.

The power control unit 120 receives electric power supplied from the communication apparatus 200 through the board interface 110 to provide the electric power or converted electric power to other units (for example, the auxiliary control unit 140, the selection unit 150, the data conversion unit 160, etc.).

The power control unit 120 may be further connected to a reset signal line from the communication apparatus 200 through the board interface 110 and be configured to block or provide electric power to other units according to the reset signal of the reset signal line.

For example, the power control unit 120 has a transistor or FET (Field Effect Transistor) controlled by a reset signal, so that if the reset signal is applied (for example, logic signal '0') according to the control of the external communication apparatus 200, the electric power of the power signal line is blocked from the communication apparatus 200 fed through the FET, and if the reset signal is removed, the electric power is supplied.

Accordingly, the power control unit 120 controls electric power not only in the case of the change in the electric power from the communication apparatus 200 but also in the case of the change in the reset signal, so that the initialization of the auxiliary control unit 140 and the data conversion unit 160 may be carried out upon the start of electric power application, and the auxiliary control unit 140 can configure the initialization of the data conversion unit 160 even in the application of the reset signal.

Moreover, in the case that the auxiliary control unit 140 and the data conversion unit 160 have a reset port respectively, the reset signals received may be delivered to each of the reset ports and the power control unit may also be configured not to control electric power upon the application of the reset signals.

The external interface 130 is an interface to be connected to the communication port 170. The external interface 130 may comprise, for example, a cable containing a plurality of signal lines for connecting to the communication port 170, a conductor for connecting the plurality of signal lines, a PCB pattern on the control board, and so on.

Furthermore, the external interface 130 may further comprise known circuits for frequency filtering of signals or impedance matching between the signal lines of the communication port 170 and the internal unit (in this case, the data conversion unit 160), and so on.

The auxiliary control unit 140 receives electric power from the power control unit 120 and initially controls the data conversion unit 160 after the reception of electric power.

In particular, the auxiliary control unit 140 starts operating to control the data conversion unit 160 through serial communication as the power control unit 120 starts supplying electric power (for example, the voltage starts transitioning from 0V to 3.3V) or as the power control unit 120 starts supplying electric power upon the removal of the reset signal (for example, from '0' to '1' of a logic signal).

The auxiliary control unit 140, for example, makes it possible to initially configure one or more registers inside the data conversion unit 160 upon the supply of electric power. The one or more registers may be registers for recording network information that makes it possible to independently determine the communication status of the communication connector 100 through the communication port 170 of the communication connector 100 without the control of the main control unit 240 of the communication apparatus 200.

For example, the network information comprises an IP address, a sub-mask, and a gateway address that can be used to determine the communication status over IP (Internet Protocol) or ICMP (Internet Control Message Protocol).

The network information makes it possible to generate a response message to the ICMP message received via the communication port 170 of the communication connector 100 and to determine the communication status of the communication connector 100 directly from outside.

After configuring the network information, the auxiliary control unit 140 removes the direct control of serial communication and allows the serial communication to be controlled by the main control unit 240 of the communication apparatus 200.

Such an auxiliary control unit 140 may consist of a microcomputer or processor, and may preferably be configured to be initialized upon the application of electric power (for example, including a power-on reset) so as to first control the data conversion unit 160 according to an internal reset and then to turn the control over to the external main control unit 240.

In addition, the auxiliary control unit 140 may further be configured to output a reset signal to the data conversion unit 160. In this case, the auxiliary control unit 140 may be configured to first apply a reset signal to the data conversion unit 160 after the application of electric power and then to remove the reset signal after a certain period of time (for example, after 100 ms).

The selection unit 150 selects one of the serial communication of the communication apparatus 200 or the serial communication of the auxiliary control unit 140 under the control of the auxiliary control unit 140 and outputs it to the data conversion unit 160. Accordingly, the data conversion unit 160 which operates according to the control from outside may be controlled by a plurality of variable control units, and allow the network information that makes it possible to initially determine the communication status by the auxiliary control unit 140 independently of or autonomously from the main control unit 240 to be configured.

The selection unit 150 connects a signal (or a signal line) (for example, a TX signal of the UART or an MOSI signal of the SPI) carrying the serial data of serial communication delivered to the data conversion unit 160 from the main control unit 240 to one input and a signal (or a signal line) carrying the serial data of serial communication delivered from the auxiliary control unit 140 to configure the network information for determining the communication status thereof to another input. In addition, a selection signal which is a control signal for selecting one of the two signals or of the serial data of the two signals is also connected to an input.

Furthermore, the selection unit 150 outputs the signal of the serial data selected out of the two signals and the output signal is connected to the data conversion unit 160. Then, the selection unit 150 selects either the signal of the serial communication of the main control unit 240 or the signal of the serial communication of the auxiliary control unit 140 based on the value of the selected signal (for example, a logic value of either '0' or '1') generated by the auxiliary control unit 140 and transmits it to the data conversion unit 160.

Such a selection unit 150 may select two signals different from the serial data discussed above according to the type of serial communication in the same way as the signal of the serial data and output them to the data conversion unit 160. For example, the selection unit 150 may receive a clock signal or chip selection signal as input according to the type of serial communication from the main control unit 240 and the auxiliary control unit 140 and transmit it to the data conversion unit 160 as an output.

The data conversion unit 160 receives serial data through serial communication and processes them. In particular, if the serial data received is control data for controlling the data conversion unit 160, then the data conversion unit 160 is controlled according to the control data. If the serial data received is data to be transmitted to outside through the communication port 170, then the data conversion unit 160 converts the received serial data and performs data communication with external apparatus through the communication port 170.

Furthermore, the data conversion unit 160 may receive communication data through the communication port 170, convert the communication data to serial data, and output the serial data to the communication apparatus 200 through serial communication.

The data conversion unit 160 carrying out such a conversion process may, for example, receive serial data from the communication apparatus 200, then convert the serial data to TCP (Transmission Control Protocol) packets, and again convert the TCP packets to IP (Internet Protocol) packets and MAC (Media Access Control) packets. Furthermore, the data conversion unit 160 may further output the converted MAC packets as a designated signal of the physical layer and transmit it to the communication port 170.

In addition, the data conversion unit 160 may receive the signal of the physical layer through the communication port 170, convert it to a MAC packet, then restore the IP packet as well as the TCP packet, and transmit the data in the payload of the TCP packet to the communication apparatus 200 as serial data through serial communication.

As such, the data conversion unit 160 makes it possible to automatically perform a two-way conversion from the transport layer of the OSI (Open Systems Interconnection) reference model to the data link layer or the MAC layer which is a type of the data link layer.

Preferably, the data conversion unit 160 is capable of two-way serial communication with the communication apparatus 200, the signal of serial communication may be received through the selection unit 150, and the signal of serial communication to be transmitted may be output through the board interface 110.

Here, the data conversion unit 160 may configure the network information mapped to an address assigned according to serial communication that makes it possible to determine the communication status of the communication connector 100, upon the application of electric power or a reset signal by means of the selection unit 150 and the auxiliary control unit 140.

Next, the data conversion unit 160 may independently process or generate a response message corresponding to the ICMP (Internet Control Message Protocol) with respect to an ICMP message received through the external interface 130 and output the response message through the external interface 130, using the IP address, sub-mask, and gateway address configured by the auxiliary control unit 140 after the application of electric power or a reset signal, before setting an address according to the serial communication of the main control unit 240.

With such a method, it is possible to readily determine the abnormality of the communication status by an apparatus (for example, a PC) through the external interface 130, even when the main control unit 240 cannot control the data conversion unit 160 through serial communication because of a problem of connection, configuration, and so on.

The data conversion unit 160 will be discussed in more detail with reference to FIG. 5.

The block diagram of the communication connector 100 in FIG. 4 has been discussed above. Each of the blocks of the communication connector 100 may be loaded on the control board in various forms. For example, the data conversion unit 160 may be constructed as a hardware logic that makes it possible to convert a packet from the transport layer to the MAC layer or to a signal of the physical layer. Such hardware logic makes it possible to perform the conversion of packets without the aid of software running on the processor.

In addition, the auxiliary control unit 140 and the data conversion unit 160 as well as the selection unit 150 may be constructed within a single chipset in the form of SIP (System In Package) or each being within a separate chipset and connected to each other through a PCB pattern.

Furthermore, the selection unit 150 may consist of a circuit containing a transistor for selecting one of the two signals.

Figure 5:
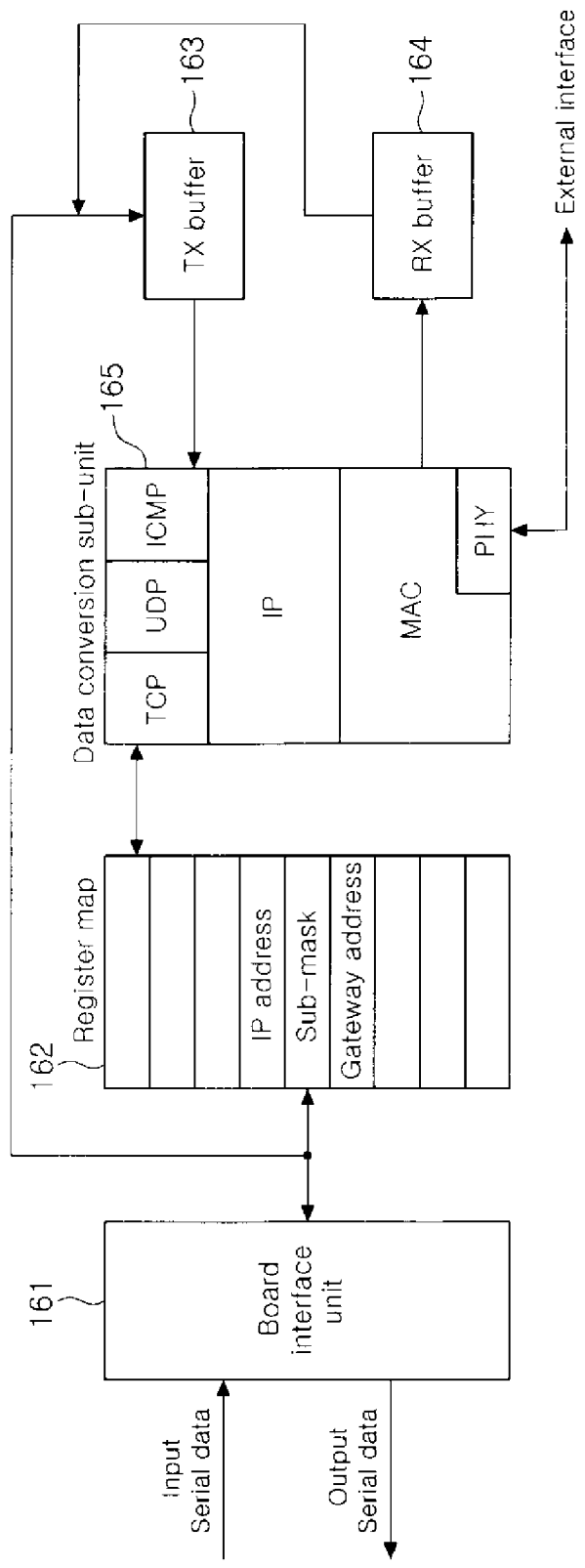
FIG. 5 shows an exemplary detailed block diagram of the data conversion unit of FIG. 4.

FIG. 5 shows an exemplary detailed block diagram of the data conversion unit 160 of FIG. 4.

According to FIG. 5, the data conversion unit 160 comprises a board interface unit 161, a register map 162, a TX buffer 163, an RX buffer 164, and a data conversion sub-unit 165. The data conversion unit 160 preferably consists of a hardware logic running without the control by an embedded processor and/or software.

For each of the blocks of FIG. 5, the board interface unit 161 receives the serial data of serial communication from the selection unit 150 and also outputs the serial data to the board interface 110.

The board interface unit 161 identifies the data to be recorded or read and address data from the received serial data, records the identified data at the identified address or loads data from the identified address, and outputs it as serial data.

Here, the address is a designated identifier for allowing access to each of the blocks or to a specific register within each of the blocks of the data conversion unit 160.

This address makes it possible, for example, to access a specific register of the register map 162 and record or read therefrom, to access the TX buffer 163 to sequentially record (in an FIFO fashion) the received data, or to access the RX buffer 164 to read the data recorded via the external interface 130 and to output it as serial data through serial communication.

Moreover, the board interface unit 161 may output an interrupt signal. The interrupt signal may be generated, for example, when the RX buffer 164 is filled over a threshold, when the TX buffer 163 is filled over or below a threshold, and so on, and transmitted to the main control unit 240 through the board interface 110.

The register map 162 is configured to comprise a plurality of registers accessible by the main control unit 240 of the communication apparatus 200 through serial communication. The respective registers of the register map 162 may be assigned with respective addresses and the data of serial data may be recorded on or read from a specific register under the control of the board interface unit 161.

Such a register map 162 makes it possible to record the information necessary for performing communication through the external interface 130. The register map 162 may be recorded by the main control unit 240.

The register map 162 makes it possible to configure various data for communication configuration, and the communication connector 100 allows the serial data received through communication to the external interface 130 to be transmitted outside, based on the recorded register value of the register map 162.

Specific registers of the register map 162 may be configured to store network information such as a network address to be used at the transport layer such as the TCP, UDP (User Datagram Protocol), and the like, or at the IP layer below the transport layer.

For example, one specifically assigned register may be configured to store the gateway address, another specifically assigned register may be configured to store the IP address of the communication connector 100, and yet another specifically assigned register may be configured to store a sub-mask.

Such network information is used as an identification address (for example, a source address) of the IP layer or higher layers with respect to the communication apparatus 200. Furthermore, the network information may respond to a message for determining the communication status (for example, a ping message for detecting internet connection or error, and so on) according to the ICMP and then may transmit a response message to outside.

Though network information such as a gateway address and the like is configured in principle by the main control unit 240 of the communication apparatus 200, since the communication connector 100 in accordance with the present invention is configured by the auxiliary control unit 140 during the initialization such as application of electric power or a reset signal, it is possible to independently verify whether there is a malfunction (for example, a communication error) in the communication connector 100 even when a problem occurs in the serial communication between the main control unit 240 and the communication connector 100.

When the network information is independently configured separately from the control of the main control unit 240 by the communication connector 100 of the present invention, an interrupt signal may also be generated and output to the main control unit 240 through the board interface 110.

Such network information may be re-configured by the main control unit 240 later, according to the control of the auxiliary control unit 140.

Moreover, the register map 162 may further comprise various addresses, information, and so on, necessary for packet conversion from the transport layer to a lower layer as registers. For example the register map 162 comprises a destination IP address, a port number, a MAC address, and so on, in addition to the IP address (source address) discussed above.

Such addresses or network information may be configured by the main control unit 240 through serial communication.

The TX buffer 163 is a buffer for storing serial data received from the main control unit 240 through the board interface unit 161, and may consist of an FIFO (First In First Out) buffer, for example.

In order to store serial data in this TX buffer 163, the board interface unit 161 identifies the address of the TX buffer 163 from the data of serial communication and records the serial data assigned in the corresponding address on this TX buffer 163.

The data of the TX buffer 163 is fed to the data conversion sub-unit 165, and is converted to data for the external interface 130 by the data conversion sub-unit 165. The RX buffer 164 is connected to the data conversion sub-unit 165, so as to convert and store sequentially the data received through the external interface 130 by the data conversion sub-unit 165.

The RX buffer 164 is also configured to output an interrupt signal when the RX buffer 164 is filled with a predetermined number or more, and then the main control unit 240 may assign the address of the RX buffer 164 so as to read the RX buffer 164 through the board interface unit 161.

Though the TX buffer 163 and the RX buffer 164 are illustratively shown with one for each, they are not limited to those illustrated and may be provided in plurality, respectively, depending on the number of sockets or the number of ports of the transport layer or a higher layer that the communication connector 100 supports.

The data conversion sub-unit 165 converts the data of the TX buffer 163 that has been received through serial communication and stored therein to a packet starting from the transport layer to the data link layer (for example, the MAC layer), based on the register value of the register map 162. The data conversion sub-unit 165 may consist of a hardware logic and accordingly, the data conversion sub-unit 165 may perform such packet conversion using the register value of the register map 162 configured by the external main control unit 240. Moreover, the data conversion sub-unit 165 may further perform the conversion of the physical layer.

For example, the data conversion sub-unit 165 may configure a TCP packet using the data of the TX buffer 163, the destination port number and the source port number configured (or set) in a specific register of the register map 162, and then convert the TCP packet to an IP packet using the destination address and source address of the IP address configured in the specific register of the register map 162, followed by the conversion to a MAC packet using a MAC address and so on.

In addition, data conversion sub-unit 165 may similarly convert a UDP packet to a MAC packet, and further convert an ICMP packet (or message) to a MAC packet.

The ICMP message makes it possible to check whether there is an abnormality in the internet communication status. The ICMP message basically requires the IP address (source address) of the communication connector 100 and further requires a sub-mask for masking and a gateway address (for example, an IP address). Moreover, it may further require other information necessary for forming the ICMP message (for example, a MAC address, etc.).

If such network information could be configured prior to configuring through serial communication according to the control of the main control unit 240, it would be possible to easily determine whether there was a problem of serial communication or a problem of the communication connector 100 when there was a communication abnormality.

With the data conversion unit 160 of FIG. 5, it is possible to reduce the load on the main control unit 240 of the communication apparatus 200 and to simplify the control flow of the main control unit 240, by allowing packets to be converted easily without establishing a communication stack.

Figure 6:
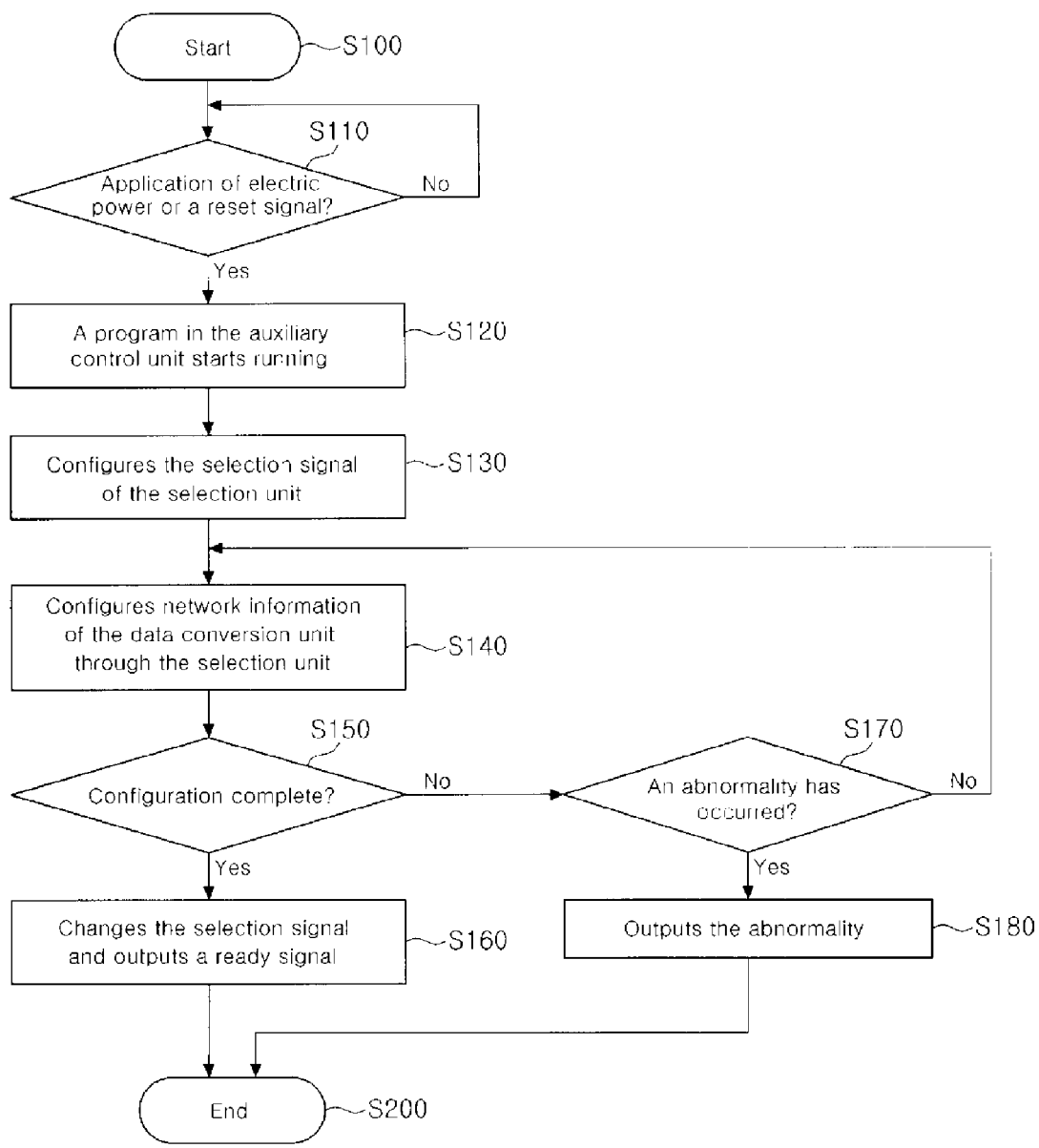
FIG. 6 illustrates a control flow performed by the blocks of FIG. 4 that makes it possible to initially determine the communication status.

FIG. 6 illustrates a control flow performed by the blocks of FIG. 4 that makes it possible to initially determine the communication status.

First in step S110, the power control unit 120 detects whether electric power is applied or a reset signal is applied and then starts applying the supplied electric power to the auxiliary control unit 140, the selection unit 150, and/or the data conversion unit 160. If the application of electric power or a reset signal has not been detected, the step S110 is repeated.

The power control unit 120 does not apply electric power while the reset signal is being applied, and the power control unit 120 starts applying electric power after the application of the reset signal is removed.

As the application of electric power starts, the voltage transits from 0V to a preset voltage level (for example, 3.3V) over time.

The start of the application of electric power automatically causes the reset of the auxiliary control unit 140 (power-on reset), and accordingly a program or control circuit (for example, a control circuit according to a state diagram) embedded in the auxiliary control unit 140 starts running in step S120.

This program or control circuit makes it possible to initially control the selection unit 150 and the data conversion unit 160 and for example, to control a selection signal, and further allows serial communication for controlling the data conversion unit 160.

As the program or the control circuit runs, the auxiliary control unit 140 configures the selection signal entered to the selection unit 150 to select the input of serial communication from the auxiliary control unit 140 in step S130.

Then the auxiliary control unit 140 configures the assigned network information of the data conversion unit 160 through serial communication via the selection unit 150 in step S140. Such network information may be configured in one or more registers of the register map 162 and may be, for example, an IP address set as default, a sub-mask set as default, a gateway address set as default, and so on for the communication connector 100.

Next, the auxiliary control unit 140 determines whether the configuration of network information has been completed in step S150. For example, the auxiliary control unit 140 may determine the completion of such configuration by reading data values of a corresponding register through the selection unit 150.

If the configuration is not normal, the auxiliary control unit 140 proceeds to step S170 and determines whether a predetermined number of attempts of the configuration has been made, and if attempts of the configuration have been made more than the predetermined number, the auxiliary control unit 140 determines that an abnormality has occurred in the serial communication or on the path thereof and then proceeds to step S180.

If the number of attempts of the configuration is lower than the predetermined number in step S170, the auxiliary control unit 140 proceeds to step S140 and repeats step S140.

In step S180, the auxiliary control unit 140 outputs the abnormality incident that has occurred. For example, to output the abnormality incident the auxiliary control unit 140 may generate an interrupt signal or control an LED that indicates the abnormality of serial communication inside the communication connector 100 connected thereto.

If the configuration has been completed, the auxiliary control unit 140 proceeds to step S160 and changes the selection signal to select the serial communication from the main control unit 240 to turn over the control of the serial communication by the main control unit 240, and then outputs a ready signal indicating that the main control unit 240 can utilize the serial communication through the board interface 110.

After completing steps S160 and S180, the auxiliary control unit 140 may stop running the program or the control circuit.

Figure 7:
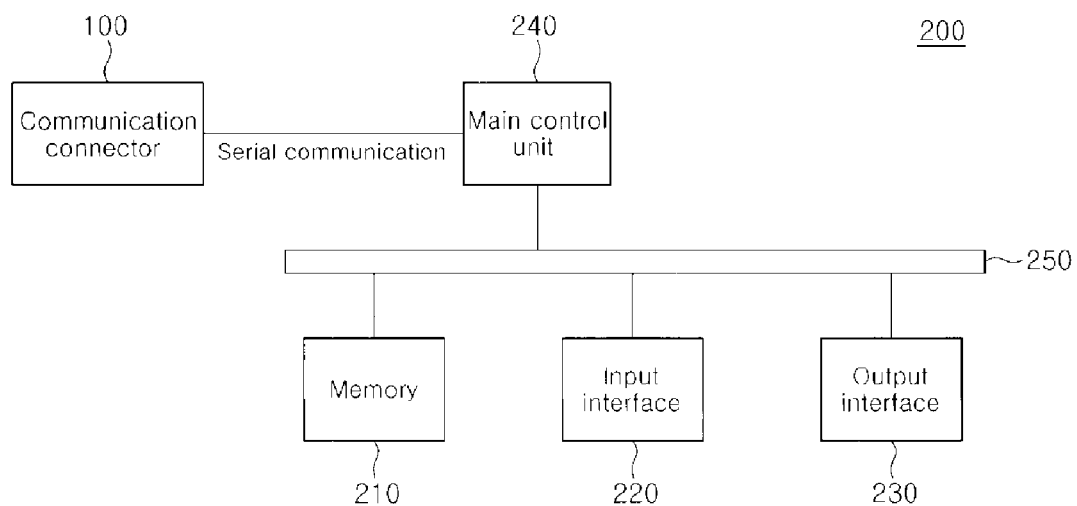
FIG. 7 shows an exemplary block diagram of a communication apparatus comprising the communication connector in accordance with the present invention.

FIG. 7 shows an exemplary block diagram of a communication apparatus 200 comprising the communication connector 100 in accordance with the present invention.

According to FIG. 7, the communication apparatus 200 comprises the communication connector 100, a memory 210, an input interface 220, an output interface 230, the main control unit 240, and a system bus/control bus 250. Some of these blocks may be omitted depending on the functionality of the communication apparatus 200.

For each of the blocks of the communication apparatus 200, the communication connector 100 makes it possible to independently determine the communication status thereof as discussed above in conjunction with FIGS. 1 to 6 and is, for example, an RJ-45 connector or is configured to comprise an RJ-45 connector.

The memory 210 comprises a volatile memory and/or a non-volatile memory and temporarily stores programs executed by the main control unit 240 or the data for serial communication which is a type of wired data communication with the communication connector 100.

The input interface 220 is an interface comprising a button, a switch, a keyboard, and the like, so as to receive a control input from a user who uses the communication apparatus 200. The input interface 220 is allowed to connect to or disconnect from communication such as wired LAN according to the control input.

The output interface 230 may comprise an LED, a display, a speaker, a buzzer and so on, and may illuminate, output an image, or output a sound signal according to the control of the main control unit 240. The output interface 230 may output, for example, a response to the control input from the input interface 220.

The main control unit 240 may perform specific functions assigned to the communication apparatus 200 and further carry out communication such as LAN communication with other external apparatus through the communication connector 100.

The main control unit 240 may be, for example, a processor, a CPU (Central Processing Unit), an MPU (Micro-processor Unit), a microcomputer, and so on that can load and execute instructions of programs.

The main control unit 240 also comprises internally a serial communication interface which is a type of wired data communication interface and controls the serial communication interface to allow communication with external peripheral devices. In general, the main control unit 240 acts as a master over serial communication and other external peripheral devices act as a slave.

For example, the main control unit 240 controls the communication connector 100 (more specifically, the data conversion unit 160) through serial communication consisting of a single or a plurality of signal lines to configure the register of the communication connector 100 and then enables communication such as LAN communication on the transport layer or a higher layer thereof.

The main control unit 240 may further comprise internally an interrupt interface and process corresponding interrupts through the control of serial communication later upon the reception of external interrupts (for example, the communication connector 100). In addition, the main control unit 240 may further comprise a GPIO (General Purpose Input Output) interface and receive certain signals through the GPIO interface.

Accordingly, during the initialization upon the application of the power source (not shown) included in the communication apparatus 200 to the communication connector 100 or the application of a reset signal by a dedicated reset circuit or the GPIO port, the IP address, sub-mask, and/or gateway address of the data conversion unit 160 of the communication connector 100 are configured immediately by the auxiliary control unit 140.

The main control unit 240 which has received a ready signal (for example, logic '0' and the like) generated after the completion of configuration at the GPIO port of the GPIO interface through certain signal line of the communication connector 100 may control the data conversion unit 160 of the communication connector 100 through the signal lines of serial communication connected to the communication connector 100 after the reception of the ready signal.

Accordingly after the completion of configuration, various control data to be configured by the main control unit 240 are transmitted as serial data to the communication connector 100 through serial communication and the data conversion unit 160 of the communication connector 100 configures them with a corresponding serial data in an assigned register. Therefore, the network information configured by the auxiliary control unit 140 may be replaced by the main control unit 240 and then communication may be made with other external devices using the configured network address and the like.

If communication is impossible through the communication connector 100, the main control unit 240 may load a test program and the like included in the memory 210 and so on. This test program may be a program that does not carry out, for example, the control of serial communication to the communication connector 100 but just provides a reset signal or electric power to the communication connector 100.

A user or developer of the communication apparatus 200 may connect the jack of a UTP cable to the communication port 170 of the communication connector 100 and connect this UTP cable to another apparatus (for example, a PC and so on). Such an apparatus may execute a communication program (for example, an ICMP-based program) and determine the communication connection or communication status with the communication connector 100 using the network information configured in the communication connector 100.

As such, it is possible to simplify problems that may occur in the communication apparatus 200 according to direct determination of communication status of the communication connector 100, and accordingly it is possible to simply and quickly determine which block has a problem during the development, during the warranty period after sale of the product, and so on.

As a matter of fact, even when a test program is not included, it is also possible to similarly determine the communication status of the communication connector 100 through other external apparatus if there is a problem in the serial communication between the main control unit 240 and the communication connector 100.

The system bus/control bus 250 may be a bus connected between the main control unit 240 and other blocks to transmit and receive data, control data, and so on, and may be, for example, a parallel bus or any serial bus used inside the communication apparatus 200.

Since the present invention as described above is capable of various substitution, modification, and change without departing from the spirit and scope of the present invention by a person having an ordinary skill in the art to which the invention pertains, the present invention is not defined by the above-described embodiments and the accompanying drawings.

What is claimed is:

1. A communication connector enabling communication status thereof to be determined independently, comprising:
   a communication port for connecting to a cable jack for LAN communication;
   a selection unit for receiving a selection signal, a first serial data signal, and a second serial data signal and for outputting one of the first serial data signal and the second serial data signal as a third serial data signal according to the selection signal; and
   a data conversion unit for receiving the third serial data signal, for recording network information from the third serial data signal, and for transmitting and receiving data for LAN communication to the communication port according to the recorded network information.

2. The communication connector of claim 1, further comprising:
   an auxiliary control unit for outputting the second serial data signal and the selection signal; and
   a plurality of contacts for connecting signal lines containing the first serial data signal and a power signal or a reset signal,
   wherein the auxiliary control unit starts operating upon application of electric power through the power signal or by reception of the reset signal, configures the selection signal to select the second serial data signal, outputs the second serial data signal containing the network information, and thereafter configures the selection signal to select the first serial data signal.

3. The communication connector of claim 2, wherein the network information comprises an IP address, a sub-mask, and a gateway address; and
wherein the data conversion unit generates a response message to an ICMP (Internet Control Message Protocol) message received through the communication port and outputs the response message through the communication port, using the IP address, the sub-mask, and the gateway address recorded from the auxiliary control unit, before recording the IP address, the sub-mask, and the gateway address from the first serial data signal.

4. The communication connector of claim 2, further comprising:
a power control unit for supplying electric power to the auxiliary control unit and the data conversion unit,
wherein the power control unit starts supplying electric power to the auxiliary control unit and the data conversion unit upon application of electric power through the power signal or removal of the reset signal, so as to allow the auxiliary control unit to configure the selection signal.

5. The communication connector of claim 2, further comprising:
a shield for housing the communication port,
wherein the auxiliary control unit, the selection unit, and the data conversion unit are contained in the shield as a single chipset through SIP (System In Package).

6. The communication connector of claim 1, wherein the data conversion unit comprises:
a register map comprising a plurality of registers accessible through the third serial data signal; and
a data conversion sub-unit for performing packet conversion of received data from the transport layer to the data link layer, based on a register value of the register map,
wherein the register map comprises registers for the IP address, the sub-mask, and the gateway address which are used in the transport layer or in a lower layer of the transport layer and are included in the network information, and
wherein one or more of the IP address, the sub-mask, and the gateway address are configured automatically during initialization of the communication connector.

7. The communication connector of claim 1, wherein the communication connector is an RJ-45 connector, and
wherein the serial data signal is a signal of SPI communication, a signal of I2C communication, a signal of UART communication, or a signal of USB communication.

8. A communication apparatus comprising a communication connector, the communication connector enabling communication status thereof to be determined independently, according to claim 1.

9. The communication apparatus of claim 8, further comprising:
a main control unit for controlling a data conversion unit of the communication connector through a signal of serial data communication,
wherein the data conversion unit of the communication connector outputs a ready signal to the main control unit after configuring assigned network information during initialization,
wherein the main control unit can control the data conversion unit through the serial data communication after reception of the ready signal, and
wherein the network information comprises one or more of an IP address, a sub-mask, and a gateway address.

* * * * *